(12) United States Patent
Pennacino et al.

(10) Patent No.: US 12,065,976 B2
(45) Date of Patent: Aug. 20, 2024

(54) OIL RECOVERY DEVICE FOR A TURBOMACHINE

(71) Applicants: SAFRAN AIRCRAFT ENGINES, Paris (FR); SAFRAN TRANSMISSION SYSTEMS, Colombes (FR)

(72) Inventors: Antoine Jacques Marie Pennacino, Moissy-Cramayel (FR); Amélie Argie Antoinette Chassagne, Moissy-Cramayel (FR); Patrice Jocelyn Francis Gedin, Moissy-Cramayel (FR); Juan-Luis Marcos Izquierdo, Moissy-Cramayel (FR); Jordane Emile André Peltier, Moissy-Cramayel (FR)

(73) Assignees: Safran Aircraft Engines, Paris (FR); Safran Transmission Systems, Colombes (FR)

( * ) Notice: Subject to any disclaimer, the term of this patent is extended or adjusted under 35 U.S.C. 154(b) by 0 days.

(21) Appl. No.: 18/348,870

(22) Filed: Jul. 7, 2023

(65) Prior Publication Data

US 2024/0011443 A1    Jan. 11, 2024

(30) Foreign Application Priority Data

Jul. 7, 2022   (FR) ...................................... 2206971

(51) Int. Cl.
*F16H 57/04*   (2010.01)
*F02C 7/06*   (2006.01)
*F02C 7/36*   (2006.01)

(52) U.S. Cl.
CPC ................. *F02C 7/36* (2013.01); *F02C 7/06* (2013.01); *F16H 57/0428* (2013.01);
(Continued)

(58) Field of Classification Search
CPC ............. F16H 57/0428; F16H 57/0456; F16H 57/0479; F16H 57/0486; F05D 2220/323;
(Continued)

(56) References Cited

U.S. PATENT DOCUMENTS 10,119,465 B2 * 11/2018 Sheridan ............... F16H 1/2818
2017/0108110 A1 * 4/2017 Sheridan ................. F16N 31/00
(Continued)

FOREIGN PATENT DOCUMENTS

FR        3 081 513 A1   11/2019
FR        3 084 407 A1    1/2020
WO    WO-2021229167 A1 * 11/2021 ............... F01D 1/24

OTHER PUBLICATIONS

France Search Report and Written Opinion mailed Feb. 13, 2023, issued in Application No. FR2206971, filed Jul. 7, 2022, 6 pages.

*Primary Examiner* — Tisha D Lewis
(74) *Attorney, Agent, or Firm* — Christensen O'Connor Johnson Kindness PLLC

(57) ABSTRACT

An oil recovery device for a reducer of an aircraft turbomachine, the device having a gutter extending around an axis and being intended to be arranged facing oil ejection means formed in a ring gear of the reducer of the turbomachine. The gutter can include at least one oil reception chamber which extends around the axis and which is open towards the axis so as to receive the oil coming from the oil ejection means. The reception chamber can be delimited by a first wall and a second wall arranged facing each other. The first wall can have an axial oil evacuation orifice and the second wall can have a radial dimension relative to the axis which increases increasingly along the axis towards the axial orifice, so as to allow oil ejected by the reducer to be conveyed to the axial orifice.

16 Claims, 5 Drawing Sheets

(52) U.S. Cl.
CPC ..... *F16H 57/0456* (2013.01); *F16H 57/0479* (2013.01); *F16H 57/0486* (2013.01); *F05D 2220/323* (2013.01); *F05D 2260/40311* (2013.01); *F05D 2260/98* (2013.01)

(58) Field of Classification Search
CPC ....... F05D 2260/40311; F05D 2260/98; F02C 7/36; F02C 7/06
See application file for complete search history.

(56) References Cited

U.S. PATENT DOCUMENTS

| | | | | |
|---|---|---|---|---|
| 2017/0241290 | A1* | 8/2017 | Pikovsky | F16H 57/048 |
| 2017/0254407 | A1* | 9/2017 | Cipolla | F16H 57/0486 |
| 2019/0360578 | A1* | 11/2019 | Chevillot | F16H 57/0456 |
| 2020/0095890 | A1* | 3/2020 | Becoulet | F01D 25/18 |
| 2021/0310421 | A1 | 10/2021 | Sheridan | |

* cited by examiner

OIL RECOVERY DEVICE FOR A TURBOMACHINE

CROSS-REFERENCE TO RELATED APPLICATIONS

This application claims priority to French Patent Application No. 2206971, filed Jul. 7, 2022, the entire disclosure of which is hereby incorporated by reference in its entirety for all purposes.

TECHNICAL FIELD

The present disclosure relates to an oil recovery device, and in particular to a turbomachine comprising such an oil recovery device.

BACKGROUND

A turbomachine with double flow typically includes an air inlet having a shrouded fan, the outlet airflow of which is divided into a primary flow that enters a primary duct of the gas generator and a secondary flow that flows in a secondary duct around the gas generator. The gas generator typically includes, from upstream to downstream in the flowing orientation of the gases, at least one compressor, a combustion chamber and at least one turbine.

In the case of a turbomachine with reducer, the fan shaft is driven by a turbine shaft via an epicyclic reducer. The reducer allows to reduce the speed of rotation of the fan shaft relative to that of the turbine shaft. The reducer is usually placed in an enclosure (commonly referred to as an "oil enclosure").

As its name suggests, an epicyclic reducer comprises an epicyclic gear train comprising at least one sun gear, a ring gear, planet gears and a planet carrier. Depending on the requirements, such an epicyclic reducer can be configured in different ways.

In the remainder of the application, particular attention will be paid to the configurations in which the ring gear is movable, namely the configuration commonly referred to as the "planetary" configuration and the configuration commonly referred to as the "differential" configuration.

More specifically, a planetary reducer has a sun gear secured to the turbine shaft, a ring gear secured to the fan shaft and a stationary planet carrier. Unlike the planetary reducer, the differential reducer has a movable planet carrier.

The bearings and the toothed wheels of such reducers are abundantly lubricated with oil, in particular to minimize wear on the contact surfaces of these various parts, and thus maximize the efficiency and the service life of the reducer.

The oil is generally injected into the reducer via various injectors, then ejected at the periphery of the ring gear under the effect of the centrifugal force.

It is known from the documents FR3084407A1 and FR3081513A1 in the name of the applicant to install an oil recovery gutter around the ring gear, in particular so as to guide the ejected oil towards one or more outlets, and thus facilitate its evacuation from the enclosure. The aforementioned documents describe open gutters that extend continuously around the ring gear.

The engine manufacturers have noted that there is room for improvement in these gutters. The aforementioned gutters are clogged with oil, and this clogging is conducive to backflow of oil onto the reducer, and in particular onto the movable parts. Such oil backflow disturbs the dynamic behavior of the reducer, to the detriment of its efficiency.

Therefore a need exists to provide a simple, effective, and economical solution for minimizing the oil returns to the reducer.

The prior art also comprises the document US2021/310421A1.

SUMMARY

The present disclosure thus proposes an oil recovery device for a reducer of an aircraft turbomachine, the device comprising a gutter extending around an axis and being intended to be arranged facing oil ejection means formed in a ring gear of the reducer of the turbomachine, the gutter comprising at least one oil reception chamber which extends around the axis and which is open towards the axis so as to receive the oil coming from the oil ejection means, the chamber being delimited by a first wall and a second wall arranged facing each other, the first wall comprising an axial oil evacuation orifice and the second wall having a radial dimension R1 with respect to the axis which increases increasingly along the axis towards the axial orifice, so as to allow the oil ejected by the reducer to be conveyed to the axial orifice.

This type of device allows most of the ejected oil to be evacuated, thus unclogging the reception chamber. This unclogging minimizes the oil returns to the reducer, which in turn improves the dynamic behavior of the reducer and its efficiency. It should be noted that once the oil has been evacuated, it can no longer return to the reducer. The size of the second wall helps to evacuate the oil, as it allows the ejected oil to be efficiently conveyed to the axial orifice, under the effect of two actions which combine advantageously. Firstly, the second wall gradually converts the radial ejection speed of the oil into an axial speed. Secondly, the second wall produces a gradual increase in the oil pressure.

Evacuating the oil axially allows to minimize the radial overall dimension of the oil recovery device.

The device according to the disclosure may comprise one or more of the following characteristic and/or steps, taken in isolation from one another or in combination with one another:
- the external ends of the first and second walls are connected end to end;
- the chamber has an axial dimension A1 in cross-section which decreases from the opening of the chamber to the bottom of the chamber;
- the first wall has a straight radial profile cross-section;
- the second wall has, in cross-section, a straight profile or a curved profile with a concavity turned towards the axis;
- the axial orifice extends along an axis which is parallel to the axis, the axis of the axial orifice being radially closer to an external end of the first wall than to an internal end of the first wall;
- the gutter comprises an axial extension extending from the first wall in a direction opposite the second wall, the extension and the first wall forming a return path for the evacuated oil;
- the gutter comprises two chambers, the second walls of the chambers being connected to each other by a connector;
- the two chambers are symmetrical with respect to a plane P which is perpendicular to the axis and passes through the connector;
- the gutter is sectorized;

the gutter comprises at least one external ring sector and one internal ring sector in succession about the axis, the axial extension of the external ring sector having an external radius R2 which is greater than the external radius R3 of the axial extension of the internal ring sector, so as to prevent the oil evacuated into the return path from falling by gravity onto the reducer;

the gutter comprises an attachment flange for attaching to a stationary part of the reducer and/or an attachment flange for attaching to a stationary element of an enclosure and/or an attachment flange for attaching to a flexible support of the device;

the device also comprises a flexible support which surrounds and is arranged facing the gutter;

the flexible support comprises an attachment flange for attaching to a stationary part of the reducer and/or an attachment flange for attaching to a stationary element of an enclosure and/or an attachment flange for attaching to the gutter.

The present disclosure also relates to an aircraft turbomachine comprising an epicyclic reducer and an oil recovery device as described above, the reducer comprising a ring gear movable in rotation about the axis, the gutter being arranged around and opposite oil ejection means formed in the ring gear.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
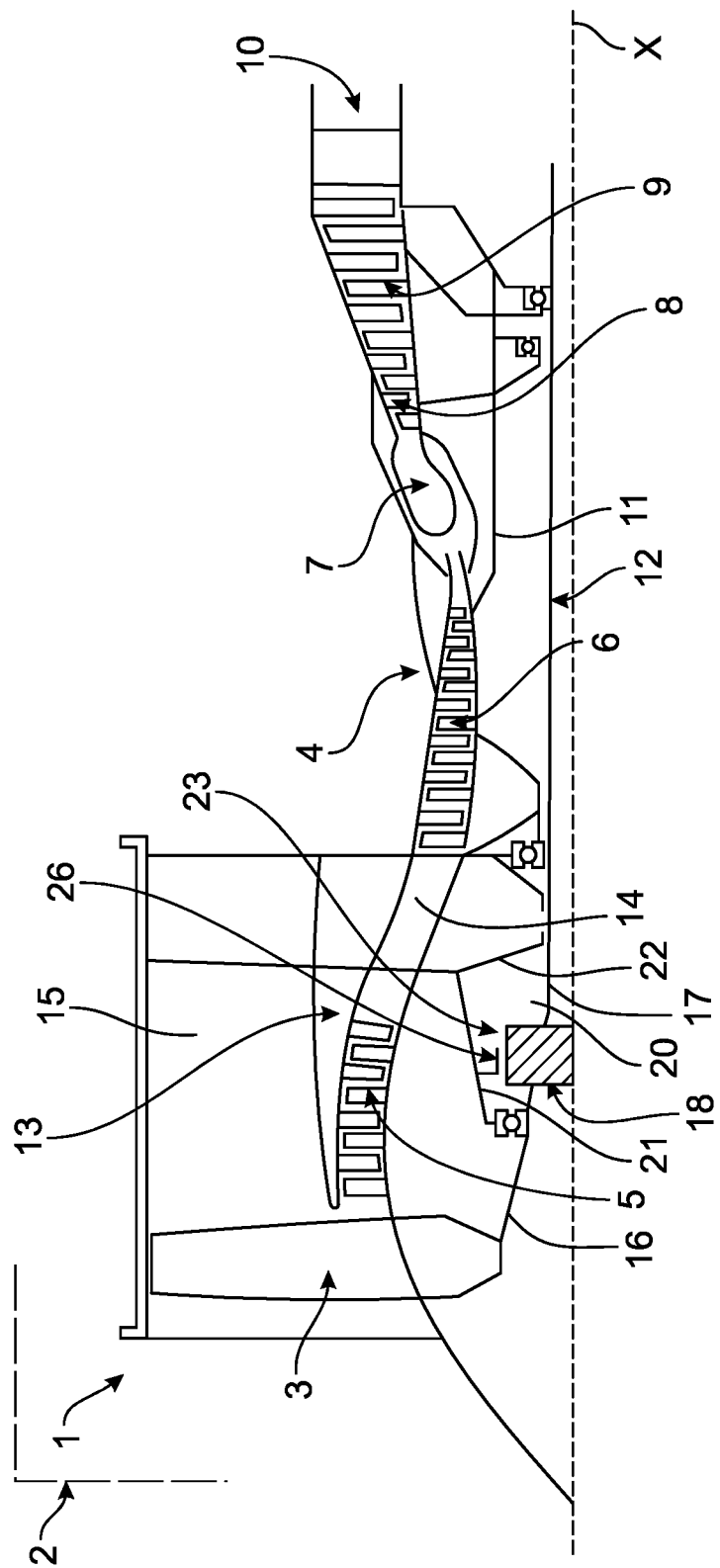
FIG. 1 is a schematic axial half-section view of a turbomachine comprising an oil recovery device according to the disclosure.

FIG. 1 partially shows a turbomachine 1 of an aircraft 2. The aircraft 2 is an airplane, for example.

By convention in this application, the terms "upstream" and "downstream" are defined in relation to the circulation orientation of the gases in the turbomachine 1.

As shown in FIG. 1, the turbomachine 1 can include, from upstream to downstream, a shrouded fan 3 and a gas generator 4 comprising a low-pressure compressor a high-pressure compressor 6, a combustion chamber 7, a high-pressure turbine 8, a low-pressure turbine 9 and an exhaust nozzle 10.

The high-pressure compressor 6 and the high-pressure turbine 8 are connected to each other by a high-pressure shaft 11 and together form a high-pressure (HP) spool. The low-pressure compressor 5 and the low-pressure turbine 9 are connected to each other by a low-pressure shaft 12 and together form a low-pressure (LP) spool.

As illustrated in FIG. 1, the flow of air generated by the fan 3 is divided by a stationary structure 13 on the turbomachine 1 into a primary flow which enters a primary duct 14 of the gas generator 4 and into a secondary flow which flows in a secondary duct 15 around the gas generator 4, the secondary flow making a major contribution to the thrust provided by the turbomachine 1.

As shown in FIG. 1, the fan 3 is driven in rotation by a fan shaft 16, which in turn is driven in rotation by a low-pressure (LP) turbine shaft 17 via an epicyclic reducer 18.

The turbomachine 1 is defined along a longitudinal axis which corresponds in some embodiments to the axis of rotation of the shaft of fan 16 and of LP turbine 17.

As indicated above, the epicyclic reducer 18 is of the "planetary" or "differential" type, hereinafter referred to as a reducer. The reducer 18 allows to reduce the speed of rotation of the fan shaft 16 compared with that of the LP turbine shaft 17.

More specifically, the reducer 18 comprises a central sun gear secured to the LP turbine shaft 17 and a ring gear 19 secured to the fan shaft 16, the sun gear and the ring gear 19 being movable about the axis. The reducer 18 also comprises a stationary planet carrier (for a "planetary" type reducer) or a movable planet carrier (for a "differential" type reducer) which carries several planet gears distributed around the axis, each planet gear being in mesh with both the sun gear and the ring gear 19.

The ring gear 19 may comprise two half-ring gears flanged together.

The reducer 18 can be single or double stage.

The movable elements of the reducer 18 (such as the planet gears) can be guided in rotation via plain bearings or rolling bearings.

The various toothed wheels of the reducer 18 can, for example, have straight toothing, helical toothing, or herringbone toothing.

As shown in FIG. 1, the reducer 18 is housed and lubricated in an annular enclosure 20 around the axis, the enclosure 20 being positioned in the upstream portion of the turbomachine 1. More specifically, the enclosure 20 is formed here by an upstream branch 21 and a downstream branch 22 of the stationary structure 13. The enclosure 20 is closed upstream by seals at the level of a bearing allowing the fan shaft 16 to pass through, and downstream by seals at the level through which the LP turbine shaft 17 passes.

The reducer 18 is lubricated via a lubrication system 23. The lubrication system 23 comprises several injectors which inject oil inside the reducer 18. The injected oil is centrifuged outwards so as to follow a predetermined way, then ejected from the reducer 18 via oil ejection means 24 formed in the ring gear 19.

In the embodiments shown in FIGS. 2 to 7, the oil ejection means 24 take the form, for example, of orifices 25 formed in the ring gear 19. The orifices 25 are radial and evenly spaced around the axis.

The lubrication system 23 also comprises an oil recovery device 26.

According to the disclosure, the device 26 comprises a gutter 27 which extends around the axis and which is arranged opposite the oil ejection means 24 formed in the ring gear 19. The gutter 27 comprises at least one oil reception chamber 28 (or inlet chamber) which extends around the axis and is open towards the axis (or inwards), so as to receive oil from the oil ejection means. The chamber 28 is delimited by a first wall 29 and a second wall 30 arranged facing each other. The first wall 29 of the chamber 28 comprises an axial oil evacuation orifice 31. The second wall 30 has a radial dimension R1 with respect to the axis which increases increasingly along the axis towards the axial orifice 31, so as to allow oil ejected by the reducer 18 to be conveyed to the axial orifice 31.

Such a device 26 allows most of the ejected oil to be evacuated and thus unclog the reception chamber. This unclogging minimizes the oil returns to the reducer, which in turn improves the dynamic behavior of the reducer and its efficiency. It should be noted that once the oil has been evacuated, it can no longer return to the reducer. The size of the second wall helps to evacuate the oil, as it allows the ejected oil to be efficiently conveyed to the axial orifice, under the effect of two actions which combine advantageously. Firstly, the second wall gradually converts the radial ejection speed of the oil into an axial speed. Secondly, the second wall produces a gradual increase in the oil pressure.

Evacuating the oil axially allows to minimize the radial overall dimension of the oil recovery device 26.

The increase in the radial dimension R1 of the second wall 30 is particularly visible in the cross-sectional views of FIGS. 2 to 7.

The oil recovery device 26 is also defined along the axis.

By convention in the present application, the radii (or radial dimensions) explained in this application have as their reference the axis of the oil recovery device 26.

Furthermore, by convention in the present application, the terms "front" and "rear" are used to define the axial positions of the elements of the device 26 in relation to each other.

Furthermore, by convention in the present application, "axial" or "axially" means any direction parallel to the axis of the turbomachine 1 or of the device 26, "radial" or "radially" means any direction perpendicular to the axis of the turbomachine 1 or of the device 26, and "circumference" or "circumferentially" means any direction relative to the circumference of the turbomachine 1 or of the device 26 (as opposed to the axial and radial directions explained above).

Finally, by convention in the present application, the terms "internal", "external", "inside" and "outside" are defined radially with respect to the axis of the turbomachine 1 or of the device 26.

In some embodiments, when the gutter 27 comprises a single chamber 28, the gutter 27 is arranged around the ring gear 19 so that the second wall 30 is radially aligned with the oil ejection means 24 of the ring gear 19, the second wall 30 then being directly opposite the oil ejection means 24. This positioning allows the ejected oil to be directed directly onto the second wall 30, to facilitate its evacuation.

The first wall 29 can be located axially in front of the second wall 30, in which case the second wall 30 flares out from the rear towards the front.

The first wall 29 can be located axially behind the second wall 30, in which case the second wall 30 flares out from the front towards the rear.

The external ends 32, 33 of the first and second walls 29, 30 can be connected end-to-end.

The external ends 32, 33 of the first and second walls 29, 30 can be connected indirectly to each other, for example via a bottom wall. The bottom wall can be straight or curved in cross-section.

In some embodiments, the chamber 28 has an axial dimension A1 in cross-section which decreases from its opening 34 to its bottom 35. The axial distance A1 corresponds to the axial distance between the first and second walls 29, 30. The progressive reduction in the axial dimension A1 of the chamber 28 allows to concentrate the oil at the level of the bottom of the chamber 28, so that it can be favor its evacuation via the axial orifice or orifices 31.

The first wall 29 may have a straight, radial profile in cross-section. The cross-section of the first wall 29 may also have a straight profile which flares out slightly along the axis towards the second wall 30.

The cross-section of the second wall 30 can have a straight profile or a curved profile with a concavity facing the axis (or the inside). On the basis of the dimensions defined above, the second wall 30 thus flares out along axis in the direction of the axial orifice or orifices 31.

The first wall 29 may comprise one or more axial oil evacuation orifices 31. The orifices 31 may have identical or different dimensional and geometric characteristics. Each orifice 31 may be circular or oblong, for example.

The first wall 29 may comprise several rows of orifices 31. The rows of orifices 31 may overlap radially. The rows of orifices 31 may be circumferentially spaced from one another.

Each axial orifice 31 extends (or is defined) along an axis which is parallel to the axis. In some embodiments, the axis of each axial orifice 31 is radially closer to the external end 32 of the first wall 29 than to the internal end 36 of the first wall 29. This radial positioning of the axial orifice or orifices 31 allows to maximize the quantity of oil evacuated.

As shown in FIG. 1, the oil recovery device 26 is attached to a stationary element of the enclosure 20, such as the upstream branch 21 or the downstream branch 22. The gutter 27 can thus comprise an attachment flange 37 for attaching to a stationary element of the enclosure 20.

The gutter 27 can be attached to a stationary part of the reducer 18, such as the planet carrier in the case of a planetary reducer 18. The gutter 27 can thus comprise an attachment flange for attaching to a stationary part of the reducer 18.

The gutter 27 can be attached to a flexible support 45. The gutter 27 can thus comprise an attachment flange for attaching to a flexible support 45.

In some embodiments, the diameter of the attachment flange (or of the attachment flanges) of the gutter 27 is greater than the diameter of the ring gear 19, so as to facilitate the integration of the gutter 27 in the engine enclosure.

The gutter 27 may comprise an axial extension 38 (or an axial skirt) extending from the first wall 29 in a direction opposite from the second wall 30, the extension 38 and the first wall 29 forming a return path 39 for the evacuated oil. The evacuated oil flows into the return path 39 under the action of gravity. Such a return path 39 allows the evacuated oil to be channeled towards one or more outlets 40 which evacuate the oil outside the enclosure 20. The outlet or outlets 40 are preferably arranged at 6 o'clock or near 6 o'clock by analogy with a clock face.

The gutter 27 may comprise a second chamber 28, the second walls 30 of the chambers 28 being connected to each other by a connector 41. The addition of a second chamber 28 allows more oil to be evacuated, thereby further reducing the amount of oil returning to the reducer 18.

The chambers 28 may have identical or different dimensional and geometric characteristics.

In some embodiments, when the gutter 27 comprises two chambers 28, the gutter 27 is arranged around the ring gear 19 so that the connector 41 is radially aligned with the oil ejection means 24 of the ring gear 19, the connector 41 then being directly opposite the oil ejection means 24. By positioning the gutter 27 in this way, it allows the connector 41 to be used to divide the ejected oil into a first oil flow which goes into the first chamber 28 and a second oil flow which goes into the second chamber 28.

In some embodiments, the chambers 28 are symmetrical with respect to a plane P which is perpendicular to the axis and passes through the connector 41.

In some embodiments, the axial dimension of the connector 41 is smaller than the axial dimension A2 of the orifices 25 forming the oil ejection means 24, so as to minimize the oil splashing (resulting from the impact of the ejected oil against the connector) while dividing the ejected oil.

In some embodiments, the connector 41 is in the form of a ridge or rounded edge.

The gutter 27 may extend continuously around the axis, and thus have an annular shape.

The gutter 27 can be sectorized. A sectorized gutter is generally easier to install than a monobloc gutter.

The sectors may have identical or different dimensional and geometric characteristics.

The sectors can be circumferentially adjacent to each other (or end-to-end), or spaced apart.

The sectors may overlap.

A sectorized gutter 27 may have a specific dimensions for successive external and internal sectors 42a, 42b around the axis.

In some embodiments, the axial extension 38 of the external sector 42a has an external radius R2 which is greater than the external radius R3 of the axial extension 38 of the internal sector 42b, so as to prevent the evacuated oil circulating in the return path 39 from falling by gravity onto movable elements of the reducer 18.

The gutter 27 can be used to support the planet carrier of a planetary reducer 18. The gutter 27 then comprises an attachment flange for attaching to the planet carrier of the reducer.

In some embodiments, the gutter 27 can comprise elastically deformable means (e.g. bellows) to give axial and/or radial mobility to the planet carrier. The chamber or the chambers 28 may be elastically deformable and form the elastically deformable means.

The device 26 can also comprise a flexible support 45 which surrounds and is arranged facing the gutter 27. The flexible support 45 allows to close the return path or paths 39, so as to force the evacuated oil to join the outlet or the outlets 40, which evacuate the oil outside the enclosure 20.

Sealing means can be placed between the gutter 27 and the flexible support 45 so as to seal the return path or paths 39.

The flexible support 45 can be used to support the planet carrier of a planetary reducer 18. The flexible support 45 then comprises an attachment flange for attaching to the planet carrier of the reducer.

The flexible support 45 can comprise elastically deformable means 47 (e.g. bellows) to give axial and/or radial mobilities to the planet carrier. The elastically deformable means 47 can be arranged around the chamber 28 or chambers 28 of the gutter 27.

The flexible support 45 can be attached to a stationary element of the enclosure 20, such as the upstream branch 21 or the downstream branch 22. The flexible support 45 can thus comprise an attachment flange 48 for attaching to a stationary element of the enclosure 20.

The flexible support 45 can be attached to a stationary part of the reducer 18, such as the planet carrier in the case of a planetary reducer 18. The flexible support 45 can thus comprise an attachment flange for attaching to a stationary part of the reducer 18.

The flexible support 45 can be attached to the gutter 27. The flexible support 45 can thus comprise an attachment flange for attaching to the gutter 27.

In some embodiments, the diameter of the attachment flange (or attachment flanges) of the flexible support 45 is greater than the diameter of the ring gear 19, so as to facilitate the integration of the flexible support 45 in the engine enclosure.

The flexible support 45 can extend continuously around the axis or be sectorized.

In FIGS. 2 to 9, the oil route is symbolized by arrows.

Figure 2:
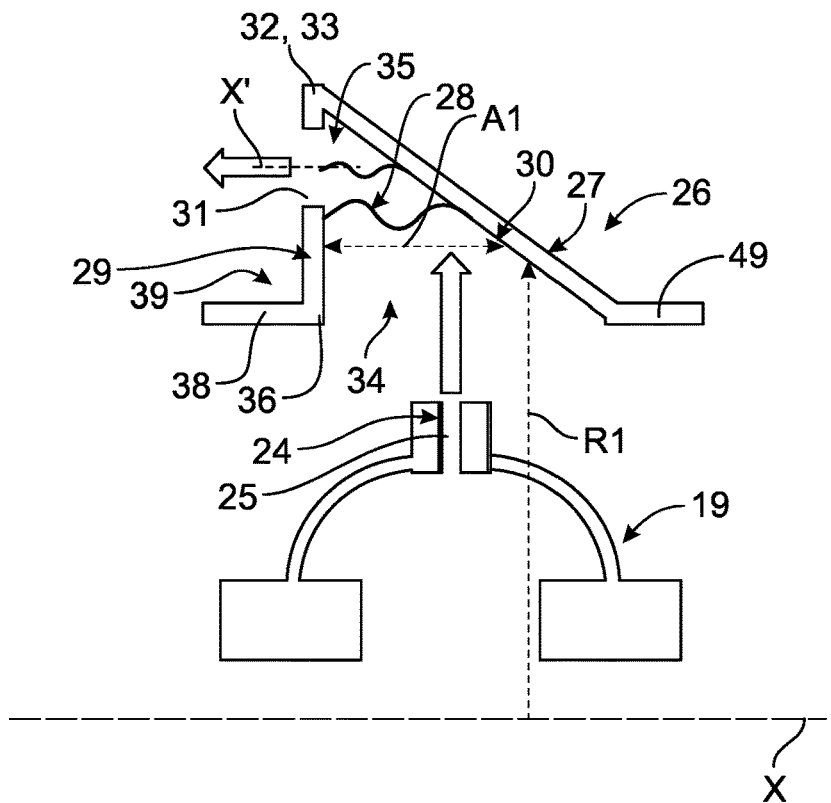
FIG. 2 is a schematic cross-sectional view of an oil recovery device according to a first embodiment.

According to the first embodiment shown in FIG. 2, the device 26 comprises a gutter 27 with a chamber 28.

More specifically, the cross-section of the chamber 28 is triangular. The first wall 29 has a straight, radial profile cross-section. In cross-section, the second wall 30 has a straight profile which flares out along the axis towards the orifice or orifices 31. The external ends 32, 33 of the first and second walls 29, 30 are connected directly to each other. In cross-section, the axial dimension A1 of the chamber 28 decreases from its opening 34 to its bottom 35. The gutter 27 comprises a front extension 38 which extends axially from the first wall 29 towards the front, the front extension 38 and the first wall 29 forming the return path 39 for the evacuated oil. The gutter 27 comprises a rear extension 49 which extends axially from the second wall 30 towards the rear. The free end of the rear extension 49 may comprise an attachment flange for attaching to a planet carrier of the reducer. The free end of the front extension 38 may comprise an attachment flange for attaching to a stationary element of the enclosure 20.

Figure 3:
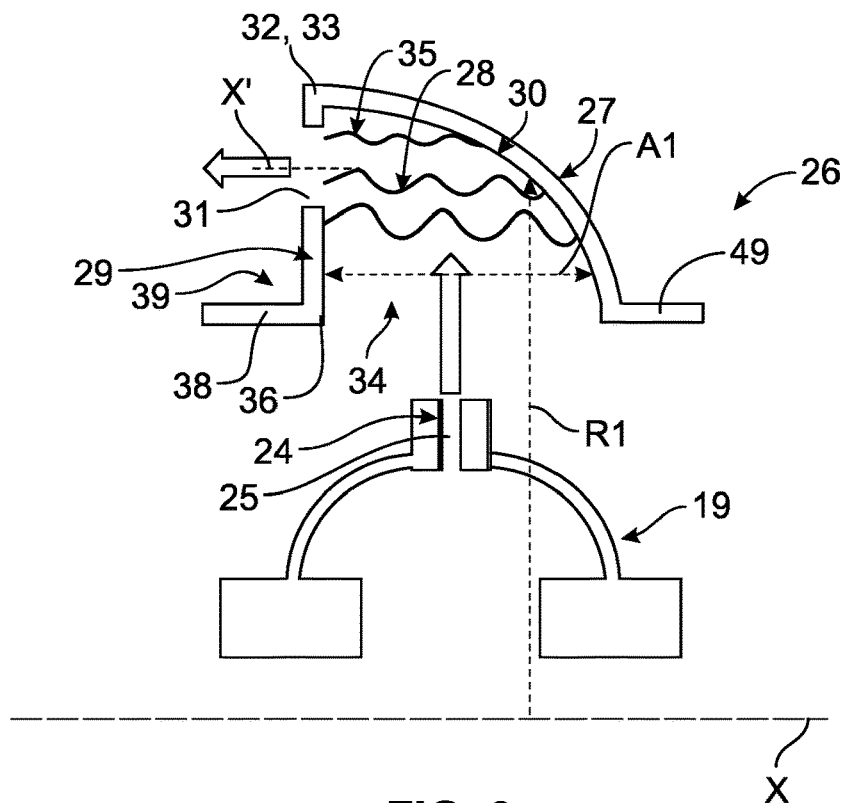
FIG. 3 is a schematic cross-sectional view of an oil recovery device according to a second embodiment.

In the second embodiment shown in FIG. 3, the device 26 comprises a gutter 27 with a chamber 28.

In this embodiment, the cross-section of the chamber 28 has a quarter-circle profile. The first wall 29 has a straight, radial profile cross-section. In cross-section, the second wall has a curved profile with a concavity facing the axis which flares out along the axis towards the orifice or the orifices 31. The external ends 32, 33 of the first and second walls 29, 30 are connected directly to each other. In cross-section, the axial dimension A1 of the chamber 28 decreases from its opening 34 to its bottom 35. The gutter 27 comprises a front extension 38 which extends axially from the first wall 29 towards the front, the front extension 38 and the first wall 29 forming the return path 39 for the evacuated oil. The gutter 27 comprises a rear extension 49 which extends axially from the second wall 30 towards the rear. The free end of the rear extension 49 may comprise an attachment flange for attaching to a planet carrier of the reducer. The free end of the front extension 38 may comprise an attachment flange for attaching to a stationary element of the enclosure 20.

Figure 4:
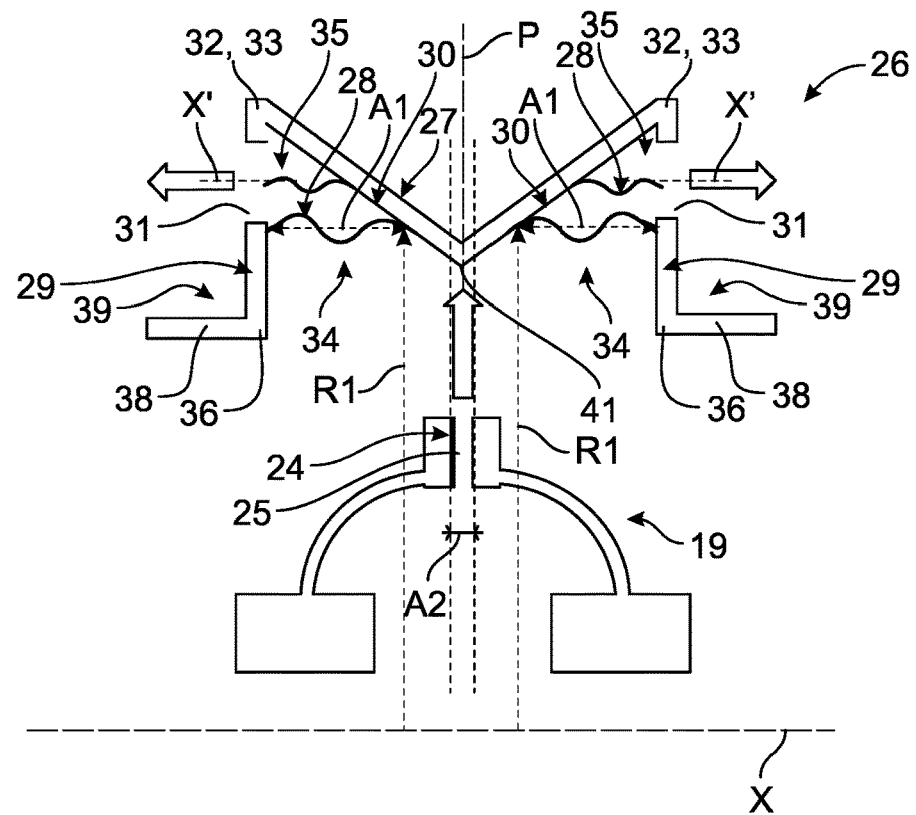
FIG. 4 is a schematic cross-sectional view of an oil recovery device according to a third embodiment.

In the third embodiment shown in FIG. 4, the device 26 comprises a gutter 27 with two chambers 28.

In some embodiments, the chambers 28 are symmetrical with respect to a plane P which is perpendicular to the axis and passes through the connector 41. Each chamber 28 has a triangular profile cross-section. The first wall 29 of each chamber 28 has a straight, radial profile cross-section. The second wall 30 of each chamber 28 has a straight cross-sectional profile which flares out along the axis towards the orifice or the orifices 31. The external ends 32, 33 of the first and second walls 29, 30 of each chamber 28 are directly connected to each other. In cross-section, the axial dimension A1 of each chamber 28 decreases from its opening 34 to its bottom 35. The connector 41 is in the form of a ridge. The gutter 27 comprises a front extension 38 extending axially from the first wall 29 of the front chamber 28, the front extension 38 and the first wall 29 (front chamber) forming a front return path 39 for the oil evacuated via the orifice or the orifices 31 of the front chamber 28. The gutter 27 also comprises a rear extension 38 extending axially from the first wall 29 of the rear chamber 28, the rear extension 38 and the first wall 29 (rear chamber) forming a rear return path 39 for the oil evacuated via the orifice or the orifices 31 of the rear chamber 28. The free end of the rear extension 38 may comprise an attachment flange for attaching to a planet carrier of the reducer. The free end of the front extension 38 may comprise an attachment flange for attaching to a stationary element of the enclosure 20.

Figure 5:
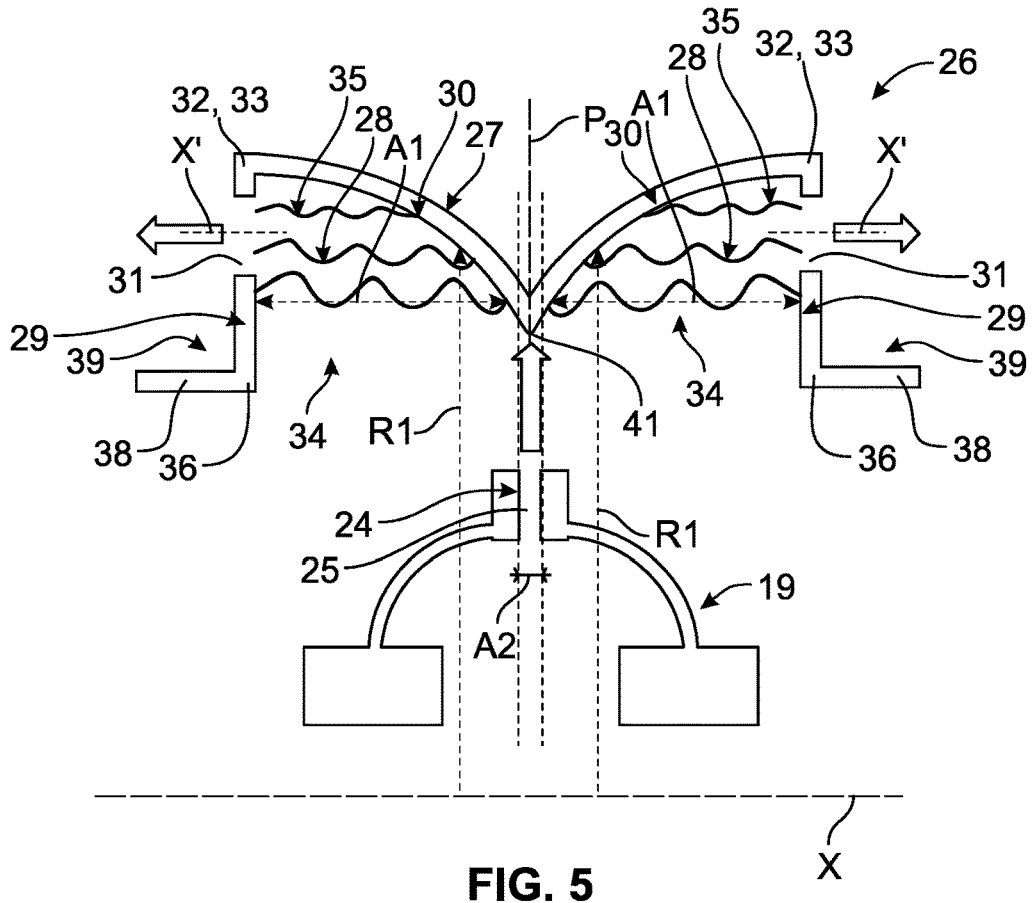
FIG. 5 is a schematic cross-sectional view of an oil recovery device according to a fourth embodiment.

In the fourth embodiment shown in FIG. 5, the device 26 comprises a gutter 27 with two chambers 28.

In this embodiment, the chambers 28 are symmetrical with respect to a plane P which is perpendicular to the axis and passes through the connector 41. In cross-section, each chamber 28 has a quarter-circle profile. The first wall 29 of each chamber 28 has a straight, radial profile cross-section. In cross-section, the second wall 30 of each chamber 28 has a curved profile with a concavity facing the axis which flares out along the axis towards the orifice or the orifices 31. The external ends 32, 33 of the first and second walls 29, 30 of each chamber 28 are directly connected to each other. In cross-section, the axial dimension A1 of each chamber 28 decreases from its opening 34 to its bottom 35. The connector 41 is rounded in shape. The gutter 27 comprises a front extension 38 extending axially from the first wall 29 of the front chamber 28, the front extension 38 and the first wall 29 (front chamber) forming a front return path 39 for the oil evacuated via the orifice or the orifices 31 of the front chamber 28. The gutter 27 comprises a rear extension 38 extending axially from the first wall 29 of the rear chamber 28, the rear extension 38 and the first wall 29 (rear chamber) forming a rear return path 39 for the oil evacuated via the orifice or the orifices 31 of the rear chamber 28. The free end of the rear extension 38 may comprise an attachment flange for attaching to a planet carrier of the reducer. The free end of the front extension 38 may comprise an attachment flange for attaching to a stationary element of the enclosure 20.

Figure 6:
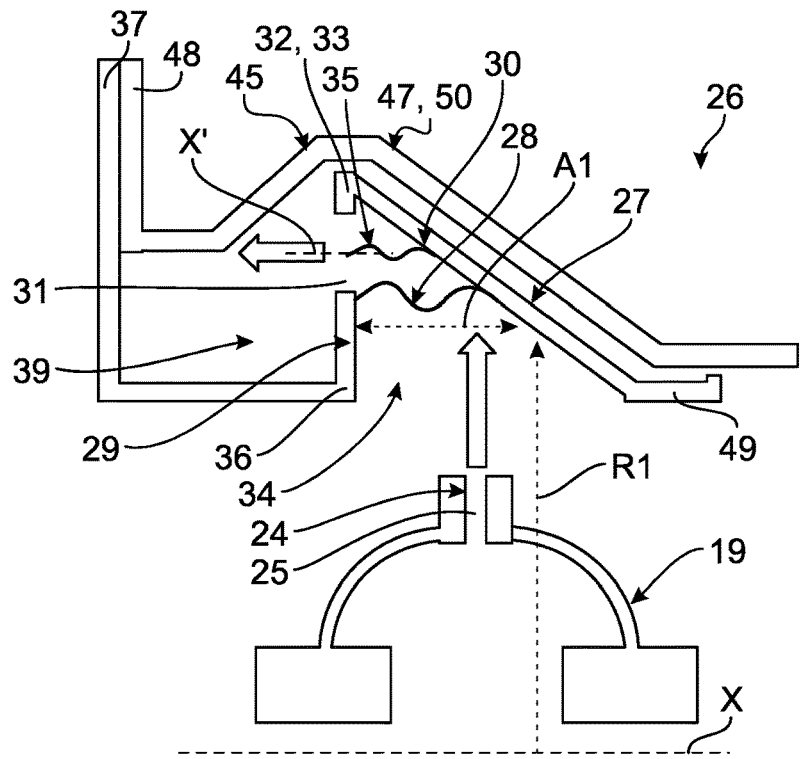
FIG. 6 is a schematic cross-sectional view of an oil recovery device according to a fifth embodiment.

In the fifth embodiment shown in FIG. 6, the device 26 comprises a gutter 27 with a chamber 28 and a flexible support 45.

The gutter 27 shown in FIG. 6 is similar to the gutter 27 shown in FIG. 2. The flexible support 45 surrounds and is arranged facing the gutter 27. The return path 39 is thus closed off externally by the flexible support 45. The flexible support 45 comprises elastically deformable means 47 in the form of a bulge 50. The bulge 50 is arranged around the chamber 28 of the gutter 27. The bulge 50 is divided into three segments, each of which has a straight cross-sectional profile. The gutter 27 and the flexible support 45 each comprise an attachment flange 37, 48 for attaching to a stationary element of the enclosure 20. The attachment flanges 37, 48 of the gutter 27 and of the flexible support 45 are arranged at the front and adjoin each other. The rear free end of the flexible support 45 comprises an attachment flange (not shown) for attaching to a planet carrier of the reducer 18.

Figure 7:
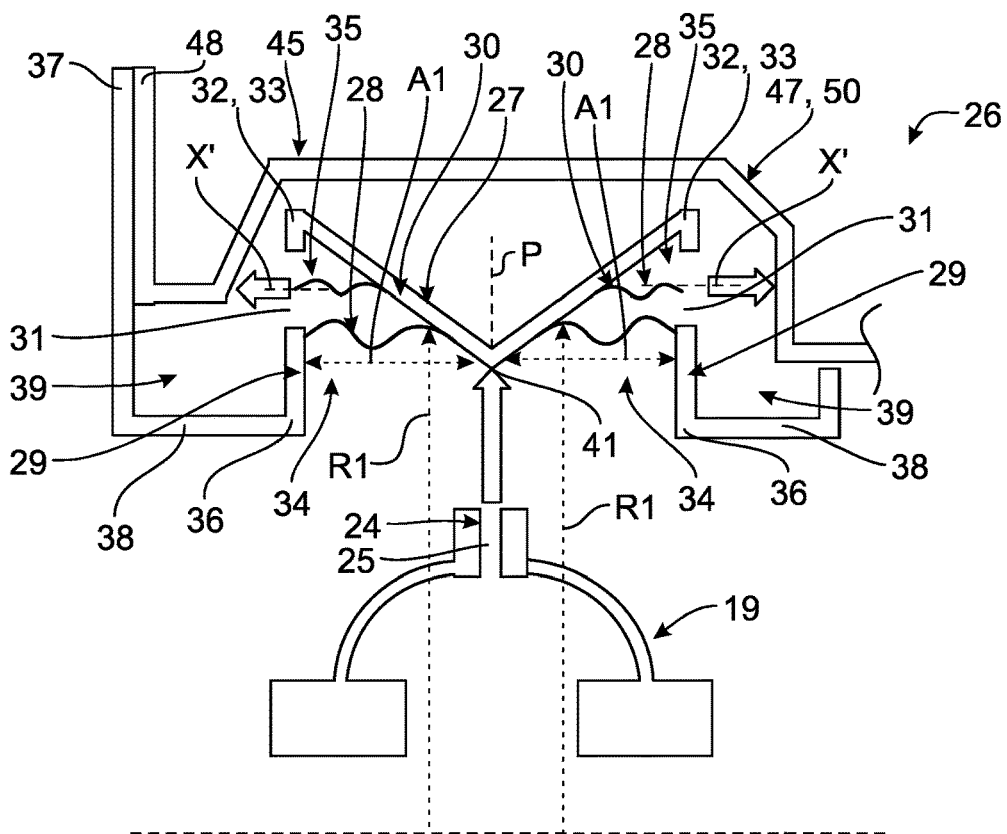
FIG. 7 is a schematic cross-sectional view of an oil recovery device according to a sixth embodiment.

In the sixth embodiment shown in FIG. 7, the device 26 comprises a gutter 27 with two chambers 28 and a flexible support 45.

The gutter 27 shown in FIG. 7 is similar to the gutter 27 shown in FIG. 4. The flexible support 45 surrounds and is arranged facing the gutter 27. The front and rear return paths 39 are thus closed off externally by the flexible support 45. The flexible support comprises elastically deformable means 47 in the form of a bulge 50. The bulge 50 is arranged around the chambers 28 of the gutter 27. The bulge 50 is divided into four segments, each of which has a straight cross-sectional profile. The gutter 27 and the flexible support 45 each comprise an attachment flange 37, 48 for attaching to a stationary element of the enclosure 20. The attachment flanges 37, 48 of the gutter 27 and of the flexible support are arranged at the front and adjoin each other. The rear free end of the flexible support comprises an attachment flange (not shown) for attaching to a planet carrier of the reducer 18.

Figure 8:
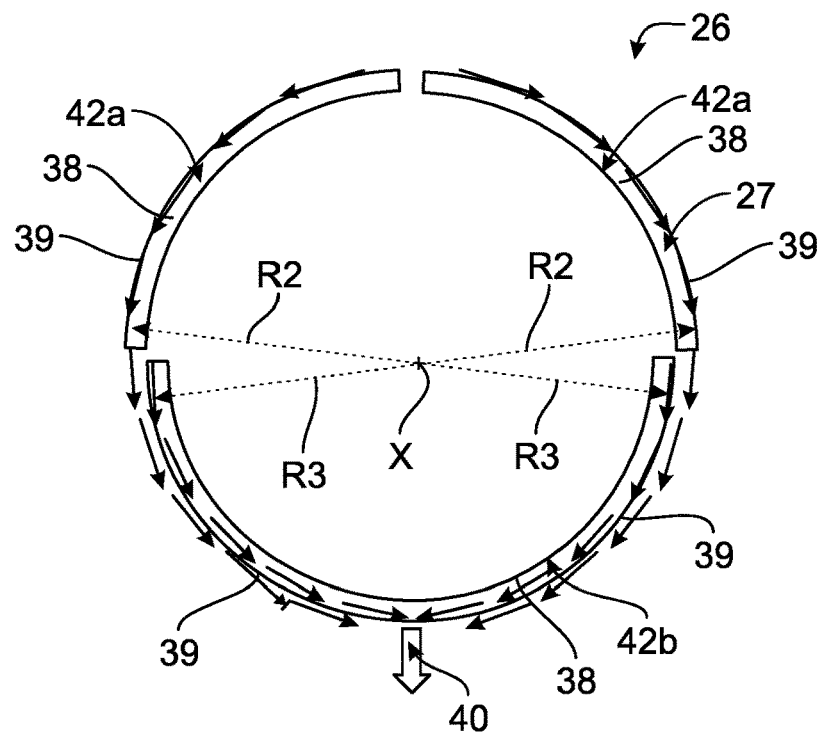
FIG. 8 is a view of an example of sectorization of the gutter for the devices illustrated in FIGS. 2 to 5.

FIG. 8 shows an example of sectorization of the gutter 27 for the devices 26 shown in FIGS. 2 to 5, i.e. the devices 26 comprising only a gutter 27.

As shown in FIG. 8, the sectorized gutter 27 comprises three ring sectors, namely two external ring sectors 42a and one internal ring sector 42b. The external ring sectors 42a have a center angle of 90° and the internal ring sector 42b has a center angle of 180°. The axial extension or extensions 38 of the external ring sector 42a have an external radius R2 which is greater than the external radius R3 of the axial extension or extensions 38 of the internal ring sector 42b, so that the evacuated oil circulates through the return path or paths 39 by gravity to a common outlet 40 located at 6 o'clock by analogy with the face of a clock, without falling onto the reducer 18.

Figure 9:
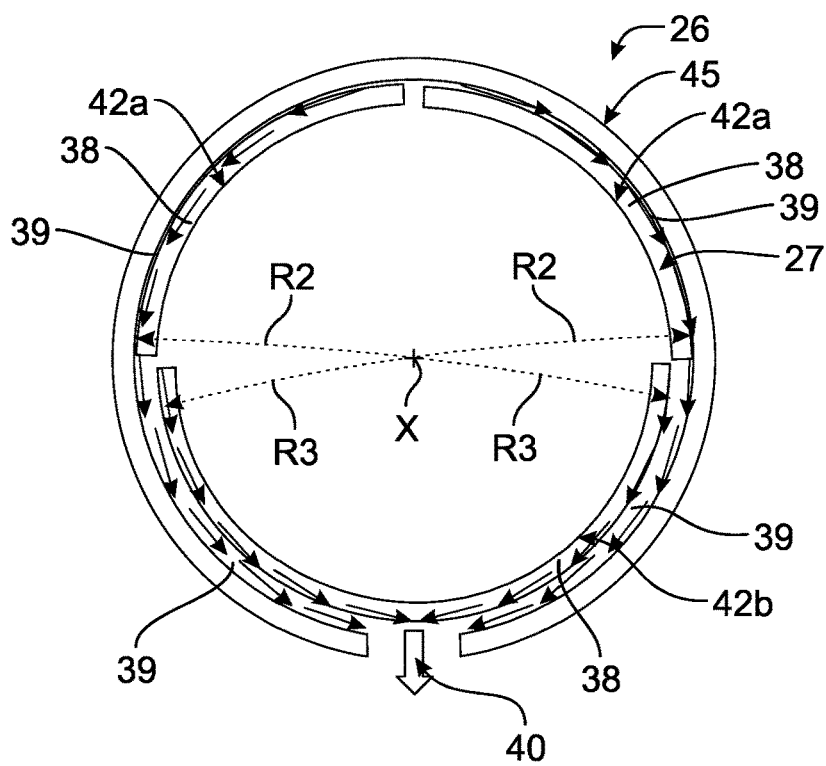
FIG. 9 is a view of an example of sectorization of the gutter for the devices illustrated in FIGS. 6 and 7.

FIG. 9 shows an example of sectorization of the gutter 27 for the devices 26 shown in FIGS. 6 and 7, i.e. the devices 26 comprising a gutter 27 and a flexible support 45.

Unlike FIG. 8, the device 26 here comprises a flexible support 45 which surrounds and is arranged facing the ring sectors 42a, 42b of the gutter 27. The flexible support 45 extends continuously around the axis.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An oil recovery device for a reducer of a turbomachine of an aircraft, the device comprising a gutter extending around an axis and configured to be arranged facing oil ejection means formed in a ring gear of the reducer of the turbomachine, the gutter comprising at least one oil reception chamber which extends around the axis and which is open towards the axis so as to receive the oil coming from the oil ejection means, the chamber being delimited by a first wall and a second wall arranged facing each other, the first wall comprising an axial oil evacuation orifice and the second wall having a radial dimension relative to the axis which increases increasingly along the axis towards the axial orifice, so as to allow the oil ejected by the reducer to be conveyed to the axial orifice, wherein radially external ends of the first and second walls are connected directly to each other, the radially external ends of the first and second walls being in contact with each other.

2. The device of claim 1, wherein the chamber has in cross-section an axial dimension which decreases from an opening of the chamber to the bottom of the chamber.

3. The device of claim 1, wherein the first wall has a straight, radial profile in cross-section.

4. The device of claim 1, wherein the second wall has, in cross-section, a straight profile.

5. The device of claim 1, wherein the axial orifice extends along an axis which is parallel to the axis, the axis of the axial orifice being radially closer to an external end of the first wall than to an internal end of the first wall.

6. The device of claim 1, wherein the gutter comprises an axial extension which extends from the first wall in a direction which is opposite to the second wall, the extension and the first wall forming a return path for the evacuated oil.

7. The device of claim 1, wherein the gutter comprises two chambers, the second walls of the chambers being connected to each other via a connector.

8. The device of claim 7, wherein the two chambers are symmetrical with respect to a plane which is perpendicular to the axis and which passes through the connector.

9. The device of claim 6, wherein the gutter is sectorized.

10. The device of claim 9, wherein the gutter comprises at least one external ring sector and one internal ring sector which are successive about the axis, an axial extension of the external ring sector having an external radius which is greater than an external radius of an axial extension of the internal ring sector, so as to prevent the oil evacuated into the return path from falling by gravity onto the reducer.

11. The device of claim 1, wherein the gutter comprises an attachment flange for attaching to at least one of: a stationary part of the reducer; an attachment flange for attaching to a stationary element of an enclosure; and an attachment flange for attaching to a flexible support.

12. The device of claim 1, wherein the device further comprises a flexible support which surrounds and is arranged opposite the gutter.

13. The device of claim 12, wherein the flexible support comprises an attachment flange for attaching to at least one of: a stationary part of the reducer; an attachment flange for attaching to a stationary element of an enclosure; and an attachment flange for attaching to the gutter.

14. A turbomachine for an aircraft, comprising:
an oil recovery device according to claim 1; and
an epicyclic reducer comprising a ring gear movable in rotation about the axis,
wherein the gutter is arranged around and opposite oil ejection means formed in the ring gear.

15. The device of claim 1, wherein the second wall has, in cross-section, a curved profile with a concavity turned towards the axis.

16. The device of claim 1, wherein the gutter is sectorized, the gutter comprising sectors arranged around the axis.

* * * * *